(12) United States Patent
Takei et al.

(10) Patent No.: US 8,690,720 B2
(45) Date of Patent: Apr. 8, 2014

(54) HYDRAULIC CONTROL DEVICE FOR AUTOMATIC TRANSMISSION

(75) Inventors: Hiroshi Takei, Wako (JP); Yoshimichi Tsubata, Wako (JP); Koichi Fushimi, Wako (JP); Kazuaki Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 250 days.

(21) Appl. No.: 13/381,023

(22) PCT Filed: Jun. 18, 2010

(86) PCT No.: PCT/JP2010/060401
§ 371 (c)(1),
(2), (4) Date: Dec. 27, 2011

(87) PCT Pub. No.: WO2011/001841
PCT Pub. Date: Jan. 6, 2011

(65) Prior Publication Data
US 2012/0103742 A1   May 3, 2012

(30) Foreign Application Priority Data

Jun. 29, 2009   (JP) ................................. 2009-154302

(51) Int. Cl.
*F16H 47/08*   (2006.01)
*F16H 41/30*   (2006.01)

(52) U.S. Cl.
USPC ............................. 475/70; 475/159; 192/3.57

(58) Field of Classification Search
USPC ...................... 475/59, 61, 63, 64, 69, 70, 159; 192/3.29, 3.33, 3.57, 3.58
See application file for complete search history.

(56) References Cited

U.S. PATENT DOCUMENTS

| | | | | |
|---|---|---|---|---|
| 3,814,221 A | * | 6/1974 | Fuehrer | 192/3.34 |
| 3,931,870 A | * | 1/1976 | Memmer | 188/296 |
| 5,906,556 A | | 5/1999 | Harada et al. | |
| 6,086,513 A | * | 7/2000 | Tominaga | 477/169 |
| 2003/0066710 A1 | * | 4/2003 | Fessler et al. | 184/6.1 |
| 2004/0226795 A1 | * | 11/2004 | Morise et al. | 192/3.29 |
| 2009/0286650 A1 | * | 11/2009 | Shudo et al. | 477/158 |

FOREIGN PATENT DOCUMENTS

| | | |
|---|---|---|
| JP | 10-132069 A | 5/1998 |
| JP | 10-141455 A | 5/1998 |

* cited by examiner

*Primary Examiner* — Roger Pang
(74) *Attorney, Agent, or Firm* — Arent Fox LLP (57) ABSTRACT

A hydraulic control device for an automatic transmission capable of adjusting the amount of lubricating oil in accordance with a load on a torque converter is provided. A main regulator valve regulates hydraulic oil from an oil pressure source on the basis of a stator reaction force of the torque converter to generate a line pressure for operating engagement of a frictional engagement element. A line pressure switching section switches the line pressure to a low line pressure in a region in which a higher line pressure is not required in response to a driving state of a vehicle, and switches the line pressure to a high line pressure when a target value of an engagement hydraulic oil pressure exceeds a predetermined pressure. A lubricating regulator valve is provided in a lubricating oil passage connected from the main regulator valve to regulate a hydraulic pressure in the lubricating oil passage to a given pressure in response to a driving state of the vehicle. A torque converter regulator valve controls a pressure inside the torque converter. A lubricating shift valve switches between an oil passage for supplying hydraulic oil discharged from the torque converter into the lubricating oil passage and an oil passage for discharging lubricating oil discharged from the torque converter regulator valve.

11 Claims, 5 Drawing Sheets

HYDRAULIC CONTROL DEVICE FOR AUTOMATIC TRANSMISSION

CROSS-REFERENCE TO RELATED APPLICATIONS

This application is a National Stage entry of International Application No. PCT/JP2010/060401, filed Jun. 18, 2010, which claims priority to Japanese Patent Application No. 2009-154302 filed Jun. 29, 2009, the disclosure of the prior application are incorporated in their entirety by reference.

TECHNICAL FIELD

The present invention relates to a hydraulic control device for an automatic transmission, and particularly, the present invention relates to a hydraulic control device for an automatic transmission capable of adjusting the amount of lubricating oil by using hydraulic oil discharged from a torque converter at a high load on a vehicle as lubricating oil and discharging part of the lubricating oil at a low load.

BACKGROUND ART

Heretofore, in a hydraulic control device for an automatic transmission, in order to lubricate frictional engagement elements and the like of an automatic transmission, lubricating oil is supplied to lubricating required portions (bearings and the like) of the frictional engagement elements in addition to hydraulic oil for the automatic transmission. This lubricating oil is supplied directly to the inside of a lubricating oil passage from a regulator valve for regulating a line pressure, which becomes an original pressure for an engagement hydraulic oil pressure of the frictional engagement elements, for example.

Further, it is known a lubricating oil supplying apparatus for an automatic transmission, which includes a first lubricating oil passage for supplying lubricating oil from a torque converter hydraulic circuit to a lubricating required portion and a second lubricating oil passage for supplying lubricating oil from a hydraulic circuit other than the torque converter hydraulic circuit (for example, a line pressure circuit, a pilot pressure circuit, a throttle pressure circuit or the like) to the lubricating required portion (for example, see Japanese Patent Application Publication No. 3-199771 (hereinafter, referred to as "Patent Literature 1")). In the lubricating oil supplying apparatus for the automatic transmission according to Patent Literature 1, in accordance with a driving status of a vehicle, lubricating oil is supplied to the lubricating required portion via the first lubricating oil passage at a low load, and lubricating oil is also supplied from the second lubricating oil passage in addition to the first lubricating oil passage at a high load in order to increase the amount of lubricating oil.

In this lubricating oil supplying apparatus for the automatic transmission disclosed in Patent Literature 1, a solenoid valve that communicates the first lubricating oil passage with the second lubricating oil passage and blocks off the first lubricating oil passage from the second lubricating oil passage is provided between the first lubricating oil passage and the second lubricating oil passage. By controlling this solenoid valve to open or close, the hydraulic oil and/or the drained hydraulic oil are supplied to the lubricating required portion from a hydraulic circuit other than the torque converter hydraulic circuit via the second lubricating oil passage when a high load is applied onto the vehicle.

SUMMARY OF THE INVENTION

Problems to be Solved by the Invention

Now, in a hydraulic control device including the lubricating oil supplying apparatus for the automatic transmission disclosed in Patent Literature 1 and supply of hydraulic oil, a hydraulic pump for supplying hydraulic oil and/or lubricating oil to each of hydraulic circuits is provided. A hydraulic pump normally has a pump characteristic in which a discharge rate changes in response to the number of revolutions of an engine. Therefore, in a low revolution region of the engine, a discharge rate of the hydraulic pump becomes lower. For this reason, when endurance of the hydraulic control device is deteriorated or the like, the amount of lubricating oil becomes lower than the required amount. There has been a problem that the lubricating required portion becomes worn or is burned out in the case where such a situation continues.

Further, in the lubricating oil supplying apparatus for the automatic transmission disclosed in Patent Literature 1, the amount of lubricating oil can be increased if necessary. However, the amount of lubricating oil cannot be reduced in a predetermined case. In the case where the total amount of lubricating oil becomes an excessive state (for example, in the case where a clutch, which is a frictional engagement element, is in a neutral state when oil temperature of the hydraulic oil is low temperature) in a state in which input torque into the automatic transmission is a low load, the amount of lubricating oil to the clutch also becomes excessive. In this case, there has been a fear that driving torque from the engine is transmitted to driven wheels by means of dragging of the clutch in spite of a non-fastened (non-engagement) state of the clutch and the vehicle thus runs (moves) in spite of a neutral state.

The present invention is made in view of the above points, and it is an object of the present invention to provide a hydraulic control device for an automatic transmission capable of adjusting the amount of lubricating oil to a lubricating required portion by using hydraulic oil discharged from a torque converter as lubricating oil at a high load and discharging part of lubricating oil at a low load.

Means for Solving the Problem

In order to solve the problems described above, a hydraulic control device for an automatic transmission according to the present invention is a hydraulic control device for an automatic transmission of a vehicle, the vehicle including a hydraulic torque converter (3) and an automatic transmission (2) connected to the torque converter (3), the automatic transmission (2) having a plurality of frictional engagement elements, the hydraulic control device (6) being capable of setting up any gear from a plurality of gears by causing any one of the plurality of frictional engagement elements to selectively carry out an engagement operation, the hydraulic control device (6) including: a main regulator valve (61) that regulates a basic hydraulic pressure of hydraulic oil supplied from an oil pressure source (60, 71) on the basis of a stator reaction force of the torque converter (3) to generate a line pressure (PL), the line pressure (PL) becoming an original pressure of an engagement hydraulic oil pressure for the frictional engagement element; a line pressure switching section (5, 64) that switches the line pressure (PL) to a low line pressure in a region in which the engagement hydraulic oil pressure does not require higher engagement hydraulic oil pressure in response to a driving state of the vehicle, the line pressure switching section switching the line pressure (PL) to a high line pressure when a target value of the engagement hydraulic oil pressure exceeds a predetermined pressure; a lubricating regulator valve (63) provided in a lubricating oil passage connected from the main regulator valve (61), the lubricating regulator valve regulating a hydraulic pressure in the lubricating oil passage to a given pressure in response to a driving state of the vehicle; a torque converter regulator valve (62) for controlling a pressure inside the torque converter (3); and a lubricating shift valve (69) that switches between an oil passage (213, 216 to 218, 230) for supplying hydraulic oil discharged from the torque converter (3) into the lubricating oil passage and an oil passage (216) for discharging lubricating oil discharged from the torque converter regulator valve (62).

According to the hydraulic control device for the automatic transmission of the present invention, it is possible to ensure the enough amount of lubricating oil to a lubricating required portion of the automatic transmission by means of a return oil passage from the torque converter when a discharge flow rate from a hydraulic pump, which is the oil pressure source, is small, for example, even when an engine is in a low revolution region. Namely, by supplying the hydraulic oil to the lubricating oil passage from the return oil passage returned from the torque converter by means of the lubricating shift valve, for example, it is possible to ensure the amount of lubricating oil even when the engine is in the low revolution region. Further, by discharging the lubricating oil from the torque converter regulator valve via the lubricating shift valve when a low load is applied onto the vehicle, it is possible to effectively prevent a clutch from dragging at a neutral range under low temperature in particular.

In the hydraulic control device for the automatic transmission according to the present invention, the line pressure switching section (5, 64) may include a solenoid valve (64) that applies an auxiliary pressure to the main regulator valve (61) in order to switch the line pressure (PL) from the high line pressure to the low line pressure.

In the hydraulic control device for the automatic transmission according to the present invention, the lubricating regulator valve (63) may reduce the hydraulic pressure within the lubricating oil passage into the given pressure when the line pressure switching section (5, 64) switches the line pressure (PL) into the low line pressure.

In the hydraulic control device for the automatic transmission according to the present invention, the torque converter (3) may include a lock-up clutch (35) for carrying out lock-up control, and the lubricating regulator valve (63) may reduce the hydraulic pressure within the lubricating oil passage into the given pressure when the line pressure switching section (5, 64) switches the line pressure (PL) to the low line pressure and engagement of the lock-up clutch (35) is released.

In the hydraulic control device for the automatic transmission according to the present invention, the lubricating shift valve (69) may block off the hydraulic oil discharged from the torque converter (3) flowing into the lubricating oil passage, and may reduce the hydraulic pressure within the lubricating oil passage into the given pressure when the line pressure switching section (5, 64) switches the line pressure (PL) into the low line pressure.

In the hydraulic control device for the automatic transmission according to the present invention, the torque converter (3) may include a lock-up clutch (35) for carrying out lock-up control; the lubricating shift valve (69) may block off the hydraulic oil discharged from the torque converter (3) flowing into the lubricating oil passage; and it may reduce the hydraulic pressure within the lubricating oil passage into the given pressure when the line pressure switching section (5, 64) switches the line pressure (PL) into the low line pressure and engagement of the lock-up clutch (35) is released.

In this regard, reference numerals in parenthesis described above exemplify, for reference, corresponding components of embodiments (will be described later).

Advantageous Effects of the Invention

According to the present invention, it is possible to ensure the enough amount of lubricating oil to a lubricating required portion of an automatic transmission by means of a return oil passage from a torque converter when a high load is applied onto a vehicle or a discharge flow rate from a hydraulic pump becomes low (for example, even when an engine is in a low revolution number region). Further, by discharging the lubricating oil from the torque converter regulator valve via the lubricating shift valve when a low load is applied onto a vehicle, it is possible to effectively prevent the amount of lubricating oil from increasing, and particularly, it is possible to effectively prevent a clutch from dragging at a neutral range under low temperature.

DETAILED DESCRIPTION OF THE INVENTION

Hereinafter, preferred embodiments of a hydraulic control device for an automatic transmission according to the present invention will be described in detail with reference to the appending drawings.

First Embodiment

Figure 1:
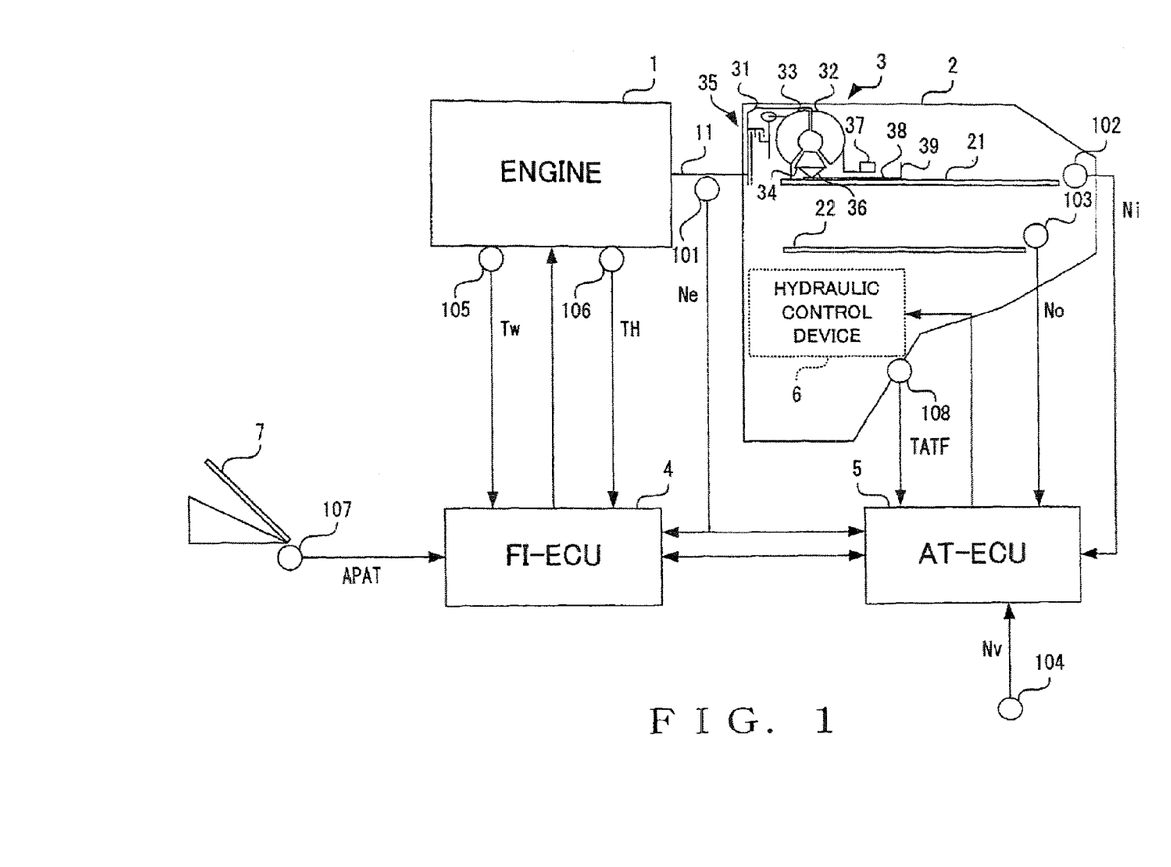
FIG. 1 is a schematic view of a driving system of a vehicle to which a hydraulic control device for an automatic transmission according to a first embodiment of the present invention is applied.

A configuration of a vehicle to which a hydraulic control device for an automatic transmission according to a first embodiment of the present invention is applied will first be described. FIG. 1 is a schematic view of a driving system of the vehicle to which the hydraulic control device for the automatic transmission according to the first embodiment of the present invention is applied. As shown in FIG. 1, the vehicle according to the present embodiment includes: an engine 1; an automatic transmission 2 coupled to the engine 1 via a hydraulic torque converter 3; an FI-ECU 4 that controls the engine 1; an AT-ECU 5 that controls the automatic transmission 2 including the torque converter 3; and a hydraulic control device 6 that controls rotary drive and lock-up control of the torque converter 3 and also controls fastening (or engagement) and release any of a plurality of frictional engagement elements of the automatic transmission 2. In this regard, the hydraulic control device for the automatic transmission according to the present invention is realized by the hydraulic control device 6 and the AT-ECU 5 that controls this hydraulic control device 6.

Rotational output of the engine 1 is outputted to a crank shaft (an output shaft of the engine 1) 11. Rotation of this crank shaft 11 is transmitted to a main shaft 21 of the automatic transmission 2 via the torque converter 3.

The torque converter 3 carries out transmission of torque through fluid (hydraulic oil). As shown in FIG. 1, the torque converter 3 includes: a front cover 31; a pump impeller (pump impeller) 32 integrally formed with this front cover 31; a turbine impeller (turbine runner) 33 placed between the front cover 31 and the pump impeller 32 so as to be opposed to the pump impeller 32; and a stator impeller 34 placed between the pump impeller 32 and the turbine impeller 33 and rotatably supported on a stator shaft (fixed shaft) 38 via a one-way clutch 36. As shown in FIG. 1, the crank shaft 11 is connected to the pump impeller 32 of the torque converter 3 via the front cover 31, and the turbine impeller 33 is connected to the main shaft (an input shaft of the automatic transmission 2) 21.

Further, a lock-up clutch 35 is provided between the turbine impeller 33 and the front cover 31. The lock-up clutch 35 carries out lock-up control by means of control of the hydraulic control device 6 on the basis of instructions of the AT-ECU 5. In this lock-up control, when the lock-up clutch 35 is pressed toward an inner surface of the front cover 31, it engages with the front cover 31. When the pressing is released, the engagement with the front cover 31 is released. A container formed by the front cover 31 and the pump impeller 32 is filled with hydraulic oil (ATF: Automatic Transmission Fluid).

In the case where the lock-up control is not carried out, the pump impeller 32 and the turbine impeller 33 are allowed to rotate mutually. In this state, when rotary torque of the crank shaft 11 is transmitted to the pump impeller 32 via the front cover 31, the hydraulic oil with which the container of the torque converter 3 is filled circulates from the pump impeller 32 to the turbine impeller 33 and subsequently to the stator impeller 34 by means of rotation of the pump impeller 32. This causes rotary torque of the pump impeller 32 to be hydrodynamically transmitted to the turbine impeller 33. An amplification function of the torque is carried out in this meantime to drive the main shaft 21. At this time, the stator impeller 34 shoulders a reaction force of the torque (hereinafter, referred to as a "stator reaction force").

On the other hand, during the lock-up control, the lock-up clutch 35 becomes an engaged state. In this case, the front cover 31 and the turbine impeller 33 integrally rotate without rotating from the front cover 31 to the turbine impeller 33 via the hydraulic oil, and the rotary torque of the crank shaft 11 is directly transmitted to the main shaft 21.

Figure 2:
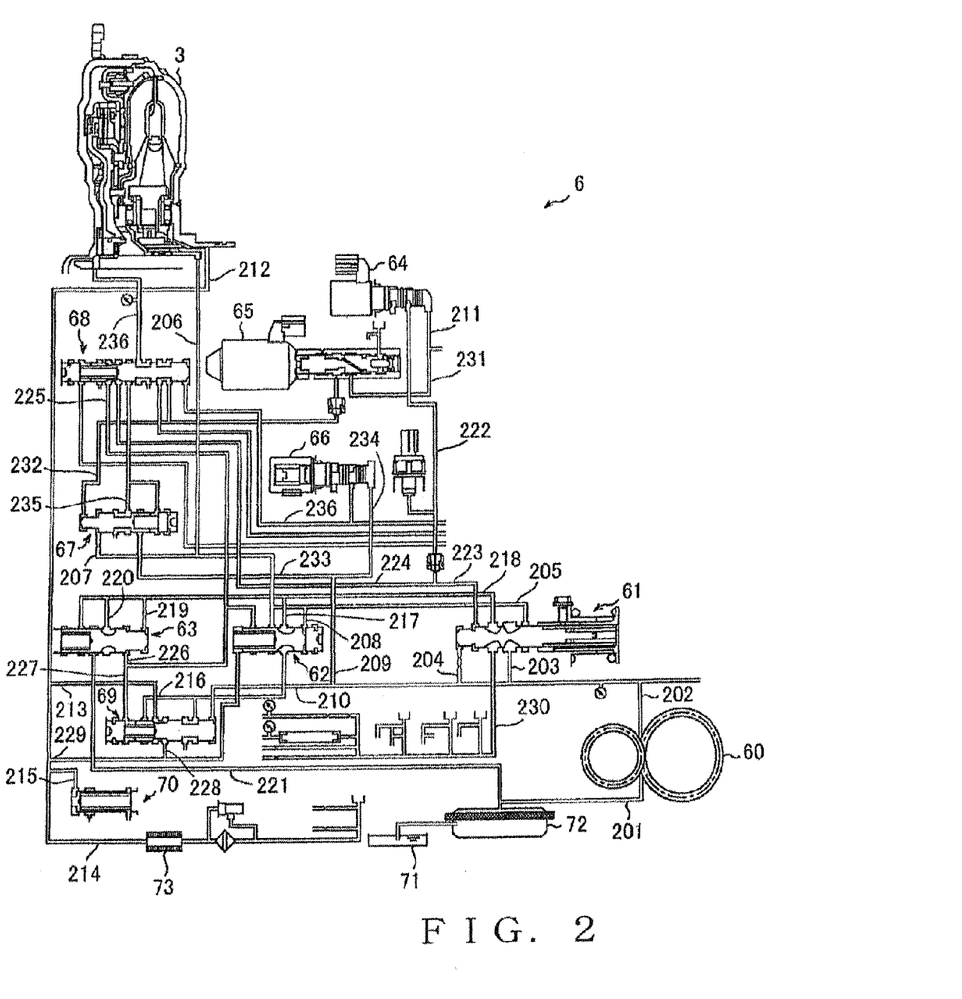
FIG. 2 is a part of a hydraulic circuit diagram of the hydraulic control device for the automatic transmission according to the first embodiment of the present invention.

In FIG. 1, a pump drive gear 37 for driving a hydraulic pump 60 shown in FIG. 2 is provided at a far right port of the pump impeller 32. A stator arm 39 that controls a main regulator valve 61 shown in FIG. 2 when hydraulic oil pressure (line pressure PL) becomes a high line pressure is provided at a far right port of the stator shaft 38.

In the present embodiment, the automatic transmission 2 is an automatic transmission for a vehicle, which has six forward gears and one reverse gear, for example. A plurality of gear trains and a plurality of clutches (frictional engagement elements) are provided in the automatic transmission 2 so as to correspond to the respective gears. Each of the gear trains is constructed from a pair of drive gear and driven gear. Since a configuration of the automatic transmission 2 is not a feature portion of the present invention, detailed description thereof using a skeleton diagram or the like is omitted. However, a person having ordinary skill in the art can adopt any configuration of known automatic transmissions appropriately.

Rotary torque of the main shaft 21 is transmitted to a counter shaft 22 via clutches and gear trains (not shown in the drawings). Further, rotary torque of the counter shaft 22 is transmitted to the driven wheels via the gear trains, a secondary shaft, an idle shaft and a differential mechanism (not shown in the drawings).

The hydraulic control device 6 is provided within the automatic transmission 2 so as to correspond to the automatic transmission 2 and the torque converter 3. This hydraulic control device 6 causes a plurality of frictional engagement elements (clutches; not shown in the drawings) in the automatic transmission 2 to selectively carry out fastening and release (an engaging operation) to set up any gear of a plurality of gears by supplying the hydraulic oil with line pressure PL (hydraulic oil pressure) to target frictional engagement elements (clutches).

Further, the hydraulic control device 6 controls a torque converter slip ratio ETR that indicates what extent rotary drive of the crank shaft 11 is transmitted to the main shaft 21 by supplying the hydraulic oil with the hydraulic oil pressure to the pump impeller 32 of the torque converter 3. Moreover, the hydraulic control device 6 controls the lock-up clutch 35 to engage under a predetermined condition, such as at cruise driving of the vehicle, by supplying the hydraulic oil with the hydraulic oil pressure to an oil chamber (not shown in the drawings) of the lock-up clutch 35.

Moreover, the hydraulic control device 6 supplies lubricating oil with a lubricating pressure to the main shaft 21, the counter shaft 22 and the like in order to lubricate the main shaft 21 or the counter shaft 22, the secondary shaft or the idle shaft (not shown in the drawings). In this regard, the secondary shaft and the idle shaft are provided in accordance with the number of gears and a shape of the automatic transmission 2.

A crank shaft revolution number sensor 101 for detecting the number of revolutions Ne of the crank shaft 11 (the number of revolutions of the engine 1) is provided in the vicinity of the crank shaft 11. A main shaft revolution number sensor 102 for detecting the number of revolutions Ni of the main shaft 21 (the number of revolutions of an input shaft of the automatic transmission 2) is provided in the vicinity of the main shaft 21. A counter shaft revolution number sensor 103 for detecting the number of revolutions No of the counter shaft 22 (the number of revolutions of an output shaft of the automatic transmission 2) is provided in the vicinity of the counter shaft 22. The revolution number data detected by the respective revolution number sensors 101 to 103 are outputted to the AT-ECU 5. Further, the revolution number data detected by the crank shaft revolution number sensor 101 is outputted to the FI-ECU 4.

Further, a vehicle speed sensor 104 for detecting vehicle speed Nv of the vehicle is provided at a predetermined position of the vehicle. The vehicle speed data detected by the vehicle speed sensor 104 are outputted to the AT-ECU 5. In this regard, without providing the vehicle speed sensor 104 for specifically detecting the vehicle speed Nv, the vehicle speed Nv may be calculated from the number of revolutions Ni of the main shaft 21 or the number of revolutions No of the counter shaft 22. For example, the vehicle speed Nv can be detected (or calculated) on the basis of a relational expression such as "Nv=Ni×(transmission gear ratio)×(circumferential length of tire)" or "Nv=No×(circumferential length of tire)".

A cooling water temperature sensor 105 for detecting temperature Tw of engine cooling water that cools the engine 1 and a throttle opening degree sensor 106 for detecting an opening degree TH of a throttle valve (not shown in the drawings) of the engine 1 are provided in the vicinity of the engine 1. Data on the temperature of engine cooling water detected by the cooling water temperature sensor 105 and data on the throttle opening degree detected by the throttle opening degree sensor 106 are outputted to the FI-ECU 4.

An accelerator pedal opening degree sensor 107, which is connected to an accelerator pedal 7 by means of wire (not shown in the drawings) and the like, for detecting the degree of opening of the accelerator pedal 7 (accelerator pedal opening degree) APAT is provided in the vicinity of the accelerator pedal 7. Data on the accelerator pedal opening degree detected by the accelerator pedal opening degree sensor 107 are outputted to the FI-ECU 4.

Further, an oil temperature sensor 108 for detecting temperature TATF of the hydraulic oil (and the lubricating oil) for the hydraulic control device 6 is provided in the vicinity of an oil tank 71 (will be described later, see FIG. 2) within the hydraulic control device 6. Temperature (oil temperature) data on the hydraulic oil detected by the oil temperature sensor 108 are outputted to the AT-ECU 5.

The FI-ECU 4 controls an output of the engine 1, that is, the number of revolutions Ne of the engine 1 on the basis of the detected data inputted from the respective sensors 101 and 105 to 107 and various kinds of data inputted from the AT-ECU 5. Further, the AT-ECU 5 controls a group of valves (will be described later) in the automatic transmission 2 on the basis of the detected data inputted from the respective sensors 101 to 104 and 108 and various kinds of data inputted from the FI-ECU 4 to carry out engagement of any one of the plurality of frictional engagement elements, engagement of the lock-up clutch 35 and the like.

Next, a configuration of the hydraulic control device 6 for the automatic transmission 2 according to the present embodiment will be described. FIG. 2 is a part of a hydraulic circuit diagram of the hydraulic control device 6 for the automatic transmission 2 according to the first embodiment of the present invention. The hydraulic control device 6 for the automatic transmission 2 according to the present invention has a feature of adjustment of hydraulic oil into the torque converter 3 and the lubricating oil for the whole hydraulic control device 6. For this reason, the hydraulic circuit diagram of the whole hydraulic control device 6 is not shown, and only a part corresponding to control of the present invention (a part of the hydraulic circuit) is shown particularly. The part of the hydraulic circuit will be described. In this regard, portions in each of which an oil passage opens at a port of each valve in this hydraulic circuit diagram means that it is connected to bearings of each shaft or it is connected to drain (the oil tank 71). Further, an oil passage that is cut off on the way is connected to the plurality of frictional engagement elements of the automatic transmission 2, the group of valves for controlling them or the like. However, their illustration and explanation will be omitted herein.

As shown in FIG. 2, the hydraulic control device 6 according to the present embodiment includes: an oil tank 71 for storing the hydraulic oil; a hydraulic pump 60 that suctions the hydraulic oil from this oil tank 71 and discharges it to the whole hydraulic control device 6; a strainer 72, provided between the oil tank 71 and the hydraulic pump 60, for eliminating impurities from the hydraulic oil; a main regulator valve 61 that regulates a line pressure PL, which becomes a base pressure for operating a plurality of frictional engagement elements, from the hydraulic pressure of the hydraulic oil supplied from the hydraulic pump 60; a TC regulator valve (torque converter regulator valve) 62 for regulating (or controlling) an inner pressure of the torque converter 3; a lubricating regulator valve 63 for regulating (or controlling) a lubricating pressure of the lubricating oil; and a group of valves 64 to 70 that carries out supply control of an engagement control hydraulic pressure to the torque converter 3 and supply control of the amount of lubricating oil to a lubricating oil passage.

As the group of valves for controlling hydraulic pressure, a first solenoid valve 64 constituting a line pressure switching section (will be described later); a linear solenoid valve 65 that controls a lock-up operation of the torque converter 3; a second solenoid valve 66; an LC control valve 67; an LC shift valve 68; a lubricating shift valve 69 that switches whether lubricating oil is to be supplied to the lubricating oil passage or not; and a cooler relief valve 70 that reduces the amount of oil returned to a oil cooler 73 by opening an oil passage when an oil passage 214 to the oil cooler 73 becomes a predetermined pressure, are provided.

The hydraulic pump 60 is driven by the engine 1 via the pump drive gear 37 of the torque converter 3 to suction the hydraulic oil from the oil tank 71 through the oil passage 201 and to pump the suctioned hydraulic oil to an oil passage 202. The oil passage 202 is connected to the main regulator valve 61 via an oil passage 203.

The main regulator valve 61 regulates the hydraulic oil supplied from the hydraulic pump 60 on the basis of the stator reaction force of the torque converter 3, and generates a line pressure PL, which becomes an original pressure of the engagement hydraulic oil pressure for the frictional engagement elements, in the oil passages 202 to 204 and an oil passage 209. The lubricating regulator valve 63 is provided within the lubricating oil passage coupled from the main regulator valve 61, and regulates hydraulic pressure within the lubricating oil passage to a predetermined pressure (lubricating pressure) depending upon a driving state of the vehicle. Further, the TC regulator valve 62 controls pressure of the inside of the torque converter 3 (torque converter inner pressure).

Even though the line pressure PL is set up to either a high line pressure or a low line pressure, the oil passage 203 is connected to an oil passage 205 via a spool channel of the main regulator valve 61, and the hydraulic oil with the line pressure PL is supplied to the pump impeller 32 of the torque converter 3 via an oil passage 206.

The first solenoid valve 64 receives the hydraulic oil with the line pressure PL regulated by the main regulator valve 61 at an oil passage 211 when to become a region in which a high engagement hydraulic oil pressure is not required for each clutch. By being opened (ON) by means of control of the AT-ECU 5 shown in FIG. 1 in this way, the first solenoid valve 64 supplies the hydraulic oil from the oil passage 211 to an oil passage 222, and supplies an auxiliary pressure to the main regulator valve 61. Namely, the hydraulic oil passing through an oil passage 223 branched from the oil passage 222 and the hydraulic oil passing through the oil passage 204 cause a pressure receiving area of the hydraulic oil (signal pressure) to become larger, and the main regulator valve 61 switches the line pressure from the high line pressure to the low line pressure. Thus, the first solenoid valve 64 and the AT-ECU 5 constitute a line pressure switching section of the present invention.

More specifically, when the vehicle including the engine 1 is in a high load state, the first solenoid valve 64 is not turned OFF by means of control of the AT-ECU 5 (an operation current is not supplied). At this time, the main regulator valve 61 is controlled by only a signal pressure from the oil passage 204, and the oil passage 203 is connected to only the oil passage 205 via the spool channel of the main regulator valve 61. Thus, the line pressure is set up to the high line pressure. On the other hand, when the vehicle including the engine 1 is in a low load state, the first solenoid valve 64 is turned ON (an operation current is supplied) by means of control of the AT-ECU 5. At this time, the hydraulic oil with the line pressure PL supplied from the oil passage 211 is supplied to the oil passage 222, and the hydraulic oil in the oil passage 223 branched from the oil passage 222 causes a spool of the main regulator valve 61 to further move to the right. The main regulator valve 61 is controlled by means of the signal pressure from the oil passage 204 and the oil passage 223, and the oil passage 203 is connected to an oil passage 205, an oil passage 218 and an oil passage 230 via the spool channel of the main regulator valve 61. The oil passage 230 is connected to a first lubricating oil passage toward a plurality of shafts (in the drawing, four shafts) including the main shaft 21. Thus, part of the hydraulic oil is directly supplied to the first lubricating oil passage as lubricating oil, whereby the line pressure is set up to the low line pressure.

The linear solenoid valve 65 receives the hydraulic oil with the line pressure PL regulated by the main regulator valve 61 at an oil passage 231, and is caused to open (ON) by supplying an electric current thereto by means of control of the AT-ECU 5. At this time, the hydraulic oil with the line pressure PL in the oil passage 231 is supplied to a far left port of the LC control valve 67 via an oil passage 232, and causes a spool of the LC control valve 67 to move to the right. Thus, the hydraulic oil with the line pressure PL supplied to the LC control valve 67 via the oil passage 209 and an oil passage 233 is supplied to an oil passage 235.

Further, the second solenoid valve 66 receives the hydraulic oil with the line pressure PL regulated by the main regulator valve 61 at an oil passage 234 branched from the oil passage 209 via the oil passage 209, and is caused to open (ON) by means of control of the AT-ECU 5. Thus, the hydraulic oil from the oil passage 234 is supplied to an oil passage 236. The hydraulic oil with the line pressure PL supplied to the oil passage 236 is supplied to a far right port of the LC shift valve 68 to cause a spool of the LC shift valve 68 to move to the left. Thus, the hydraulic oil supplied from the oil passage 235 is supplied to an oil chamber (not shown in the drawings) in the vicinity of the lock-up clutch 35 of the torque converter 3 via the oil passage 236, whereby engagement control (lock-up control) for the lock-up clutch 35 is carried out. In this regard, when the second solenoid valve 66 is caused to close (OFF) by means of control of the AT-ECU 5, the spool of the LC shift valve 68 is pressed to the right by means of a spring in the LC shift valve 68, whereby the oil passage 235 is closed. Thus, the hydraulic oil with which the oil chamber corresponding to the lock-up clutch 35 is filled is drained to the oil tank 71 via a spool channel of the LC shift valve 68, whereby engagement of the lock-up clutch 35 (lock-up control) is released. In this way, the lock-up control for the torque converter 3 is carried out by the linear solenoid valve 65, the second solenoid valve 66, the LC control valve 67 and the LC shift valve 68.

The hydraulic oil supplied to the pump impeller 32 of the torque converter 3 via the oil passage 206 circulates through the turbine impeller 33 and the stator impeller 34, and is discharged to the oil passage 212. The hydraulic oil discharged to the oil passage 212 is supplied to the oil cooler 73 via the oil passage 214, and is then supplied to a second lubricating oil passage for a plurality of shafts (two in the drawing) including the counter shaft 22 after it is cooled by the oil cooler 73. In this regard, when the pressure in the oil passage 214 becomes a predetermined pressure or more, in order to reduce the amount of oil supplied to the oil cooler 73, the cooler relief valve 70 is caused to open, and the hydraulic oil is drained via the oil passage 215.

The lubricating shift valve 69 receives the hydraulic oil with the line pressure PL at a far right port via an oil passage 210, and a spool of the lubricating shift valve 69 is caused to move to the left. At this time, an oil passage 213 branched from the oil passage 212 is connected to an oil passage 216 via a spool channel of the lubricating shift valve 69; the oil passage 216 is connected to an oil passage 217 via a spool channel of the TC regulator valve 62; and the oil passage 218 branched from the oil passage 217 is connected to the oil passage 230 via the spool channel of the main regulator valve 61. This makes it possible to supply the hydraulic oil discharged from the torque converter 3 to the oil passage 212 (torque converter returned oil) to the first lubricating oil passage.

Further, by causing the first solenoid valve 64 to open (ON), the hydraulic oil supplied from the oil passage 211 is supplied to the oil passage 222, and hydraulic oil in an oil passage 224 branched from the oil passage 222 is supplied to an oil passage 225 via the spool channel of the LC shift valve 68. The lubricating shift valve 69 receives the hydraulic oil with the line pressure PL at a far left port via an oil passage 227 branched from the oil passage 225, and the hydraulic pressure received at the far right and left ports and biasing force of a spring in the lubricating shift valve 69 cause the spool to move to the right. At this time, the oil passage 213 branched from the oil passage 212 is connected to an oil passage 228 via the spool channel of the lubricating shift valve 69. Thus, the hydraulic oil discharged from the torque converter 3 and supplied to the lubricating shift valve 69 is returned to the oil passage 214 via an oil passage 229 branched from the oil passage 228. Further, the lubricating oil discharged from the TC regulator valve 62 and discharged to the oil passage 216 is drained via another spool channel (first spool channel left from the far right port, in the drawing) of the lubricating shift valve 69. In this way, the lubricating shift valve 69 switches, in accordance with whether the line pressure PL is switched between the high line pressure and the low line pressure by means of an operation of the first solenoid valve 64, whether the hydraulic oil discharged from the torque converter 3 is supplied to the first lubricating oil passage or the lubricating oil discharged from the TC regulator valve 62 is drained.

Figure 3:
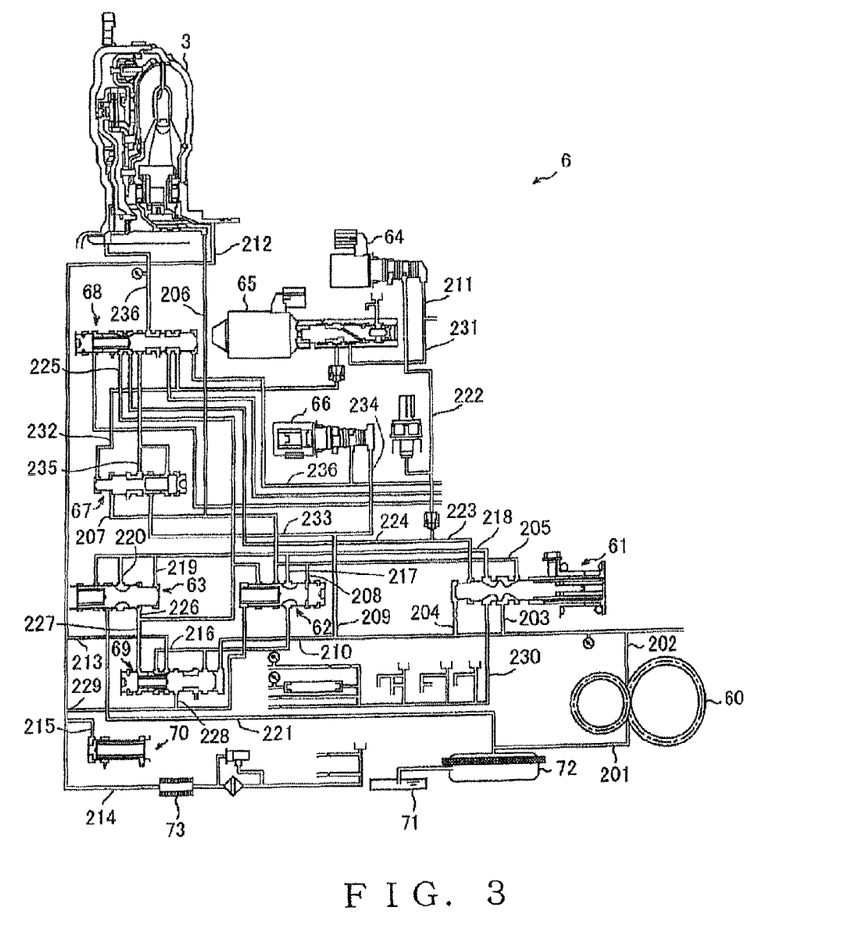
FIG. 3 is a hydraulic circuit diagram showing a state of respective valves when a high load is applied onto the hydraulic control device for the automatic transmission shown in FIG. 2.

Next, an operation of the hydraulic control device 6 for the automatic transmission 2 according to the present embodiment will be described. A state of the respective valves in the hydraulic control device 6 when a high load is applied onto the vehicle including the engine 1 will first be described. FIG. 3 is a hydraulic circuit diagram showing the state of the respective valves when a high load is applied onto the hydraulic control device 6 for the automatic transmission 2 shown in FIG. 2.

The hydraulic pump 60 suctions the hydraulic oil from the oil tank 71 via the strainer 72 and the oil passage 201, and pumps the suctioned hydraulic oil to the oil passage 202. The hydraulic oil with the line pressure PL in the oil passage 204 branched from the oil passage 202 causes a spool of the main regulator valve 61 to move to the right. Thus, the oil passage 203 branched from the oil passage 202 is connected to the oil passage 205 via the spool channel of the main regulator valve 61, and the hydraulic oil supplied to the oil passage 205 is supplied to the torque converter 3 via the oil passage 206 branched from the oil passage 205.

The hydraulic oil discharged from the torque converter 3 to the oil passage 212 is supplied to the lubricating shift valve 69 via the oil passage 213 branched from the oil passage 212. The hydraulic oil from this oil passage 213 is supplied to the oil passage 216 via the spool channel of the lubricating shift valve 69, and is supplied to the oil passage 217 via the spool channel of the TC regulator valve 62. The hydraulic oil supplied to the oil passage 217 is supplied to the main regulator valve 61 via the oil passage 218 branched from the oil passage 217; it is supplied to the oil passage 230 via the spool channel of the main regulator valve 61; and it is finally supplied to the first lubricating oil passage.

Thus, when a high load is applied onto the vehicle including the engine 1, the hydraulic control device 6 for the automatic transmission 2 according to the present embodiment can supply the lubricating oil to the first lubricating oil passage from the return oil passage 212 from the torque converter 3 by means of the lubricating shift valve 69. Therefore, it is possible to expect to ensure the amount of lubricating oil optimum for a driving state of the vehicle.

Further, even in a low revolution region of the engine 1 in which a discharge flow rate from the hydraulic pump 60 becomes lower, it is possible to supply the enough amount of lubricating oil to the lubricating required portion of the automatic transmission 2 by utilizing the hydraulic oil discharged to the oil passage 212 from the torque converter 3 as lubricating oil in this manner.

Moreover, by synchronizing (or linking) a switching operation of the lubricating shift valve 69 with switching of the line pressure PL between the high line pressure and the low line pressure, it is possible to keep correlation between high or low of the line pressure PL and large or small of the amount of lubricating oil, and it is possible to ensure the amount of lubricating oil in accordance with a load of the vehicle.

In this regard, as described above, at a high load of the vehicle, the AT-ECU 5 turns the first solenoid valve 64 OFF to set up the line pressure PL to the high line pressure, and also sets up the lubricating pressure to the high line pressure by introducing the hydraulic oil discharged from the torque converter 3 into the first lubricating oil passage. In this case, as shown in FIG. 3, the linear solenoid valve 65, the second solenoid valve 66, the LC control valve 67 and the LC shift valve 68 that carry out lock-up control for the torque converter 3 are not involved in setup of line pressure and lubricating pressure. For that reason, the lock-up control for the lock-up clutch 35 of the torque converter 3 can be controlled ON/OFF in accordance with a driving state of the vehicle by means of control of the AT-ECU 5. In this regard, FIG. 3 shows a state of the respective valves 65 to 68 when the lock-up control is turned OFF (when engagement of the lock-up clutch 35 is released).

Figure 4:
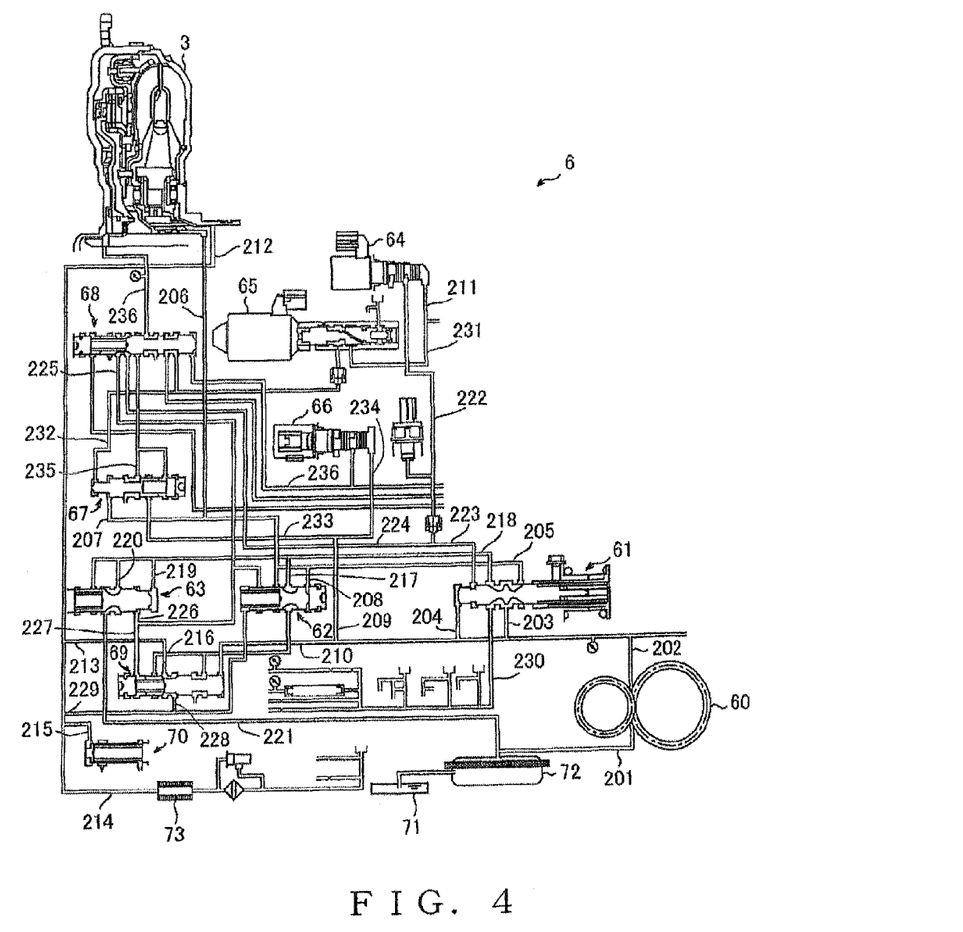
FIG. 4 is a hydraulic circuit diagram showing a state of the respective valves when a low load is applied onto the hydraulic control device for the automatic transmission shown in FIG. 2.

Next, a state of each of the valves in the hydraulic control device 6 when a low load is applied onto the vehicle including the engine 1 will be described. FIG. 4 is a hydraulic circuit diagram showing a state of the respective valves when a low load is applied onto the hydraulic control device 6 for the automatic transmission 2 shown in FIG. 2. In this regard, an operation state of the respective valves of the hydraulic control device 6 when a low load is applied onto the vehicle may hereinafter be referred to as a "drag prevention mode".

In the drag prevention mode, the hydraulic pump 60 suctions the hydraulic oil from the oil tank 71 via the strainer 72 and the oil passage 201, and pumps the suctioned hydraulic oil to the oil passage 202. In addition to the hydraulic oil with the line pressure PL in the oil passage 204 branched from the oil passage 202, the hydraulic oil with the line pressure PL supplied to the oil passages 222, 223 from the oil passage 211, to which the line pressure PL is supplied, via the first solenoid valve 64 causes the spool of the main regulator valve 61 to further move to the right. At this time, the oil passage 203 branched from the oil passage 202 is connected to the oil passage 205, the oil passage 218 and the oil passage 230 via the spool channel of the main regulator valve 61. The hydraulic oil supplied to the oil passage 205 is supplied to the torque converter 3 via the oil passage 206 branched from the oil passage 205. Further, the hydraulic oil supplied to the oil passage 230 is supplied to the first lubricating oil passage as the lubricating oil.

The hydraulic oil supplied to the oil passage 218 is supplied to the oil passage 217 branched from the oil passage 218; it is supplied to the oil passage 216 via the spool channel of the TC regulator valve 62; and it is further drained via the spool channel of the lubricating shift valve 69. Further, the hydraulic oil supplied to the oil passage 218 is supplied to a far right port of the lubricating regulator valve 63 via an oil passage 219 branched from the oil passage 218, whereby the spool of the lubricating regulator valve 63 is caused to move to the left. Moreover, the hydraulic oil supplied to the oil passage 218 is supplied to an oil passage 220 branched from the oil passage 218; it is supplied to an oil passage 221 via a spool channel of the lubricating regulator valve 63; and it is finally drained to the strainer 72.

In this way, when a low load is applied onto the vehicle, the hydraulic oil (lubricating oil) with the line pressure PL of the low line pressure is directly supplied to the first lubricating oil passage via the spool channel of the main regulator valve 61 and the oil passage 230. However, the lubricating oil supplied to the oil passage 218 is drained via the oil passage 217, the spool channel of the TC regulator valve 62, the oil passage 216 and the spool channel of the lubricating shift valve 69, and it is drained to the strainer 72 via the spool channel of the lubricating regulator valve 63 and the oil passage 221. Thus, the amount of lubricating oil becomes an excessive state, and it is possible to effectively prevent drag torque from being generated although the clutch is in a non-fastened state.

When a low load is applied onto the vehicle (in the drag prevention mode), no electric current is applied to the linear solenoid valve 65 by means of control of the AT-ECU 5, and the second solenoid valve 66 is turned OFF. At this time, the hydraulic oil with the line pressure PL in the oil passage 224 branched from the oil passage 222 from the first solenoid valve 64 is supplied to the oil passage 225 via the spool channel of the LC shift valve 68. The hydraulic oil in an oil passage 226 branched from the oil passage 225 is supplied to a port of the lubricating regulator valve 63, and a spool of the lubricating regulator valve 63 is caused to move to the left. Further, the hydraulic oil supplied to the oil passage 227 branched from the oil passage 225 is supplied to a far left port of the lubricating shift valve 69. This causes the spool of the lubricating shift valve 69 to move to the right by means of the line pressure PL of the far right port and the far left port and a spring in the lubricating shift valve 69.

On the other hand, the hydraulic oil discharged from the torque converter 3 to the oil passage 212 is supplied to the lubricating shift valve 69 via the oil passage 213 branched from the oil passage 212 as well as the time when a high load is applied onto the vehicle. However, the oil passage 213 is not connected to the oil passage 216, but to the oil passage 228 via the spool channel of the lubricating shift valve 69. For this reason, the hydraulic oil supplied to the oil passage 228 is returned to the oil passage 214 branched from the oil passage 212 via the oil passage 229 branched from the oil passage 228.

In this way, the hydraulic control device 6 for the automatic transmission 2 according to the present embodiment allows the amount of lubricating oil directly supplied to the first lubricating oil passage from the main regulator valve 61 to be reduced by draining the hydraulic oil with the line pressure PL from the main regulator valve 61 and the lubricating regulator valve 63 when the vehicle including the engine 1 becomes a low load, particularly, at low revolution of the engine 1. Thus, it is possible to effectively prevent the clutch from dragging when the hydraulic oil (lubricating oil) is at low temperature. Further, by restricting the amount of lubricating oil when the line pressure PL is set up to the low line pressure, it is possible to improve fuel economy (gasoline mileage) while the vehicle runs on a low load.

Further, by changing the inner pressure in the torque converter 3 into the high line pressure by means of a signal pressure of the first solenoid valve 64 when a low load is applied onto the vehicle (in the drag prevention mode), it is possible to further restrict the amount of lubricating oil. In this case, it is also possible to ensure a flow rate of the hydraulic oil to the torque converter 3 and the amount of oil returned to the oil cooler 73 in a low revolution region of the engine 1.

Moreover, by changing the given pressure (lubricating pressure) of the lubricating regulator valve 63 into an extremely low line pressure by means of the signal pressure from the first solenoid valve 64 when a low load is applied onto the vehicle (in the drag prevention mode), the hydraulic oil is allowed to circulate to an intake oil passage of the hydraulic pump 60 by discharging the lubricating oil to the strainer 72 from the lubricating regulator valve 63. This makes it possible to improve pump efficiency of the hydraulic pump 60, and it is possible to expect to improve fuel economy (gasoline mileage) of the vehicle. Further, by discharging the lubricating oil in this manner, it is possible to restrict the amount of lubricating oil.

Second Embodiment

Figure 5:
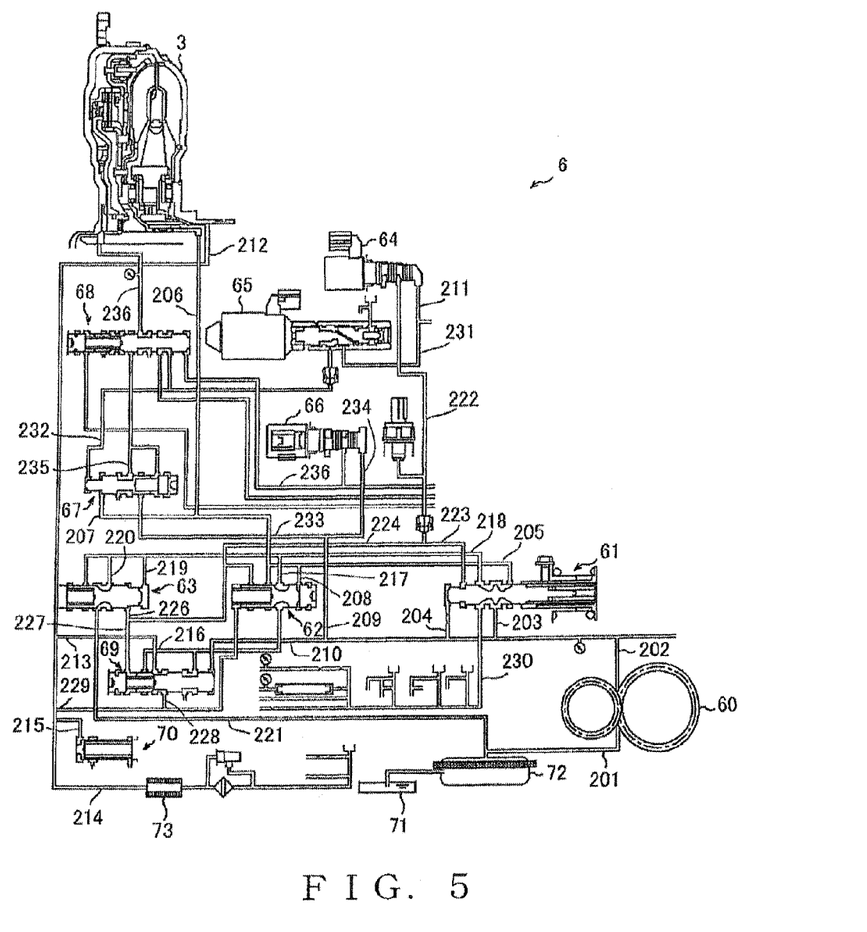
FIG. 5 is a part of a hydraulic circuit diagram of a hydraulic control device for an automatic transmission according to a second embodiment of the present invention.

Next, a hydraulic control device for an automatic transmission according to a second embodiment of the present invention will be described. In this regard, a configuration of a vehicle to which a hydraulic control device according to the present embodiment is applied is similar to that of the vehicle according to the first embodiment shown in FIG. 1. Therefore, its illustration and explanation will be omitted. FIG. 5 is a part of a hydraulic circuit diagram of the hydraulic control device for the automatic transmission according to the second embodiment of the present invention.

Constituent elements of a hydraulic control device 6 according to the present embodiment are substantially the same as the constituent elements of the hydraulic control device 6 according to the first embodiment. Thus, the same reference numerals are assigned to the similar constituent elements, and detailed explanation for the respective constituent elements will be omitted. The hydraulic control device 6 according to the present embodiment is different from the hydraulic control device 6 according to the first embodiment in that an oil passage 224 branched from an oil passage 222 from a first solenoid valve 64 is directly connected to each port of a lubricating regulator valve 63 a the lubricating shift valve 69 without passing through an LC shift valve 68. Such a configuration has a difference on a low load of the vehicle, in particular. For this reason, an explanation of a configuration of each of the valves at a high load is omitted, and a configuration of each of the valves on a low load will be described in detail with reference to FIG. 5.

In a drag prevention mode, a hydraulic pump 60 suctions the hydraulic oil from an oil tank 71 via a strainer 72 and an oil passage 201, and pumps the suctioned hydraulic oil to an oil passage 202. In addition to the hydraulic oil with a line pressure PL in an oil passage 204 branched from the oil passage 202, the hydraulic oil with the line pressure PL supplied to the oil passage 222 and an oil passage 223 from an oil passage 211, to which the line pressure PL is supplied, via the first solenoid valve 64 causes a spool of a main regulator valve 61 to further move to the right. At this time, an oil passage 203 branched from the oil passage 202 is connected to each of an oil passage 205, an oil passage 218 and an oil passage 230 via a spool channel of the main regulator valve 61. The hydraulic oil supplied to the oil passage 205 is supplied to a torque converter 3 via the oil passage 206 branched from the oil passage 205. Further, the hydraulic oil supplied to the oil passage 230 is supplied to a first lubricating oil passage as lubricating oil.

The hydraulic oil supplied to the oil passage 218 is supplied to an oil passage 217 branched from the oil passage 218; it is supplied to an oil passage 216 via a spool channel of a TC regulator valve 62; and it is further drained via a spool channel of the lubricating shift valve 69. Further, the hydraulic oil supplied to the oil passage 218 is supplied to a far right port of the lubricating regulator valve 63 via an oil passage 219 branched from the oil passage 218, and a spool of the lubricating regulator valve 63 is caused to move to the left. Moreover, the hydraulic oil supplied to the oil passage 218 is supplied to an oil passage 220 branched from the oil passage 218; it is supplied to an oil passage 221 via a spool channel of the lubricating regulator valve 63; and it is finally drained to the strainer 72.

Thus, when a low load is applied onto the vehicle, the hydraulic oil with the line pressure PL of the low line pressure is directly supplied to the first lubricating oil passage via the main regulator valve 61 as lubricating oil. However, the lubricating oil supplied to the oil passage 218 is drained via the TC regulator valve 62 and the lubricating shift valve 69, and it is drained via the lubricating regulator valve 63. This causes the amount of lubricating oil to be an excessive state, it possible to effectively prevent drag torque from being generated even though the clutch is in a non-fastened state.

Unlike the hydraulic control device 6 according to the first embodiment, the hydraulic oil of an oil passage 224 branched from the oil passage 222 is supplied to both a port of the lubricating regulator valve 63 and a port of the lubricating shift valve 69 via an oil passage 226 and an oil passage 227 those are branched from the oil passage 224 without passing through the LC shift valve 68. Thus, in the lubricating regulator valve 63, the spool is caused to further move to the left, and in the lubricating shift valve 69, a spool is caused to move to the right by means of the line pressure PL at the far right port and the far left port and a spring in the lubricating shift valve 69.

In the present embodiment, the LC shift valve 68 utilized for the lock-up control is not arranged on an oil passage for reducing the amount of lubricating oil. For this reason, it is possible to carry out the lock-up control for the torque converter 3 even when a low load is applied onto the vehicle. Namely, when a second solenoid valve 66 is turned ON by means of control of an AT-ECU 5, the LC shift valve 68 receives the hydraulic oil of an oil passage 236 at a far right port of the LC shift valve 68 to cause a spool of the LC shift valve 68 to move to the left. Further, when an electric current is applied to a linear solenoid valve 65 by means of control of the AT-ECU 5, an LC control valve 67 receives the hydraulic oil of an oil passage 232 at a far left port of the LC control valve 67 and receives the hydraulic oil with the line pressure PL at another port via an oil passage 207 branched from the oil passage 205 to cause a spool of the LC control valve 67 to move to the right. Thus, the hydraulic oil with the line pressure PL of an oil passage 233 branched from an oil passage 209 is supplied to an oil passage 235 via a spool channel of the LC control valve 67. The hydraulic oil supplied to the oil passage 235 is supplied to the oil passage 236 via a spool channel of the LC shift valve 68, and the hydraulic oil with the line pressure PL is finally supplied to an oil chamber of the torque converter 3, whereby a lock-up clutch 35 is caused to engage.

On the other hand, no electric current is applied to the linear solenoid valve 65 by means of control of the AT-ECU 5. When the second solenoid valve 66 is turned OFF, and a spring in the LC shift valve 68 causes the spool of the LC shift valve 68 to be pressed to the right. At this time, the oil passage 236 whereby the hydraulic oil is supplied to the oil chamber of the torque converter 3 at the lock-up control is connected to a drain via the spool channel of the LC shift valve 68, as shown in FIG. 5. This causes engagement of the lock-up clutch 35 to be released. In this regard, FIG. 5 shows a state of the respective valves at non-engagement (non-fastening) of the lock-up clutch 35.

As well as the hydraulic control device 6 according to the first embodiment, the hydraulic oil discharged from the torque converter 3 to an oil passage 212 is supplied to the lubricating shift valve 69 via an oil passage 213 branched from the oil passage 212. However, the oil passage 213 is not connected to the oil passage 216, but to an oil passage 228 via the spool channel of the lubricating shift valve 69. The hydraulic oil supplied to the oil passage 228 is returned to an oil passage 214 branched from the oil passage 212 via an oil passage 229 branched from the oil passage 228.

Thus, the hydraulic control device 6 for the automatic transmission 2 according to the present embodiment can reduce the amount of lubricating oil directly supplied to the first lubricating oil passage from the main regulator valve 61 by draining the hydraulic oil with the line pressure PL from the main regulator valve 61 and the lubricating regulator valve 63 when the vehicle including the engine 1 becomes a low load (particularly, when the engine 1 is in a low revolution). This makes it possible to effectively prevent the clutch from dragging when the hydraulic oil (lubricating oil) has low temperature. Further, it is possible to improve fuel economy (gasoline mileage) while the vehicle drives on a low load by restricting the amount of lubricating oil when the line pressure PL is set up to the low line pressure.

Further, by changing the inner pressure of the torque converter 3 into a high line pressure by means of the signal pressure from the first solenoid valve 64 when a low load is applied onto the vehicle (in the drag prevention mode), it is possible to restrict the amount of lubricating oil further. In this case, even in a low revolution region of the engine 1, it is possible to ensure a flow rate of the hydraulic oil to the torque converter 3 and the amount of oil returned to the oil cooler 73.

Moreover, by changing the given pressure of the lubricating regulator valve 63 into an extremely low line pressure by means of the signal pressure from the first solenoid valve 64 when a low load is applied onto the vehicle (in the drag prevention mode), the hydraulic oil is allowed to readily circulate to an intake oil passage of the hydraulic pump 60 by discharging the lubricating oil to the strainer 72 from the lubricating regulator valve 63. This makes it possible to improve pump efficiency of the hydraulic pump 60, and it is possible to expect to improve fuel economy (gasoline mileage) of the vehicle. Further, by discharging the lubricating oil in this manner, it is possible to restrict the amount of lubricating oil.

As described above, the hydraulic control device 6 for the automatic transmission 2 of the present invention is a hydraulic control device for an automatic transmission of a vehicle, the vehicle including the hydraulic torque converter 3 and the automatic transmission 2 connected to the torque converter 3, the automatic transmission 2 having a plurality of frictional engagement elements (clutches), the hydraulic control device 6 being capable of setting up any gear from a plurality of gears by causing any one of the plurality of frictional engagement elements to selectively carry out an engagement operation, the hydraulic control device 6 including: the main regulator valve 61 that regulates a basic hydraulic pressure of the hydraulic oil suctioned from the oil tank 71 by means of the hydraulic pump 60 on the basis of the stator reaction force of the torque converter 3 to generate the line pressure PL, the line pressure PL becoming an original pressure of an engagement hydraulic oil pressure for the frictional engagement element; the AT-ECU 5 and the first solenoid valve 64 constituting the line pressure switching section that switches the line pressure PL to a low line pressure in a region in which the engagement hydraulic oil pressure does not require higher engagement hydraulic oil pressure in response to a driving state of the vehicle, the line pressure switching section switching the line pressure PL to a high line pressure when a target value of the engagement hydraulic oil pressure exceeds a predetermined pressure; the lubricating regulator valve 63 provided in a lubricating oil passage connected from the main regulator valve 61, the lubricating regulator valve 63 regulating a hydraulic pressure (lubricating pressure) in the lubricating oil passage to a given pressure in response to a driving state of the vehicle; the TC regulator valve 62 for controlling a pressure (torque converter inner pressure) inside the torque converter 3; and the lubricating shift valve 69 that switches, on the basis of whether the line pressure PL is the high line pressure or the low line pressure, between the oil passages 213, 216 to 218, 230 for supplying the hydraulic oil discharged from the torque converter 3 into the lubricating oil passage and the oil passage 216 for discharging the lubricating oil discharged from the TC regulator valve 62. Therefore, it is possible to ensure the enough amount of lubricating oil to a lubricating required portion of the automatic transmission 2 by means of the return oil passage 212 from the torque converter 3 when a high load is applied onto the vehicle or when a discharge flow rate from the hydraulic pump 60 is small, for example, even when the engine 1 is in a low revolution region. Further, by supplying the hydraulic oil to the lubricating oil passage from the return oil passage 212 returned from the torque converter 3 by means of the lubricating shift valve 69, for example, it is possible to ensure the amount of lubricating oil even when the engine 1 is in the low revolution region. Further, by discharging the lubricating oil from the TC regulator valve 62 via the lubricating shift valve 69 and via the lubricating regulator valve 63 when a low load is applied onto the vehicle, it is possible to effectively prevent a clutch from dragging at a neutral range under low temperature in particular.

According to the hydraulic control device 6 for the automatic transmission 2 of the present invention, by controlling the optimal line pressure PL, the inner pressure of the torque converter 3 and the lubricating pressure in accordance with a load state of the vehicle, a cooler flow rate flowing into the oil cooler 73 is increased by changing the line pressure PL into the low line pressure and changing the inner pressure of the torque converter 3 into the high line pressure when the hydraulic oil for the automatic transmission 2 is required to be cooled, for example, and as a result, it is possible to adjust the amount of lubricating oil properly by turning the increased lubricating pressure down.

Further, by cooperating (or linking) an operation of the lubricating shift valve 69 with the line pressure control, for example, when the amount of lubricating oil is increased by changing the line pressure PL into the low line pressure, it is possible to ensure the amount of lubricating oil without supplying the hydraulic oil of the return oil passage 212 from the torque converter 3 to the first lubricating oil passage. In this case, by discharging the lubricating oil supplied from the TC regulator valve 62 to the oil tank 71 by means of the lubricating shift valve 69, it is possible to reduce the amount of lubricating oil further. Further, for example, by restricting the amount of lubricating oil when the line pressure PL of the low line pressure is generated at a low load on the vehicle, it is possible to improve fuel economy (gasoline mileage) of the vehicle.

In the drag prevention mode, by releasing engagement of the lock-up clutch 35 and setting up the line pressure PL to the low line pressure, for example, it is possible to reduce the amount of lubricating oil when a low load is applied onto the vehicle and the engine 1 is in a low revolution region. It is also possible to ensure the enough amount of lubricating oil to the lubricating required portion of the automatic transmission 2 when a high load is applied onto the vehicle or when the engine 1 is in a high revolution region. Further, by synchronizing the drag prevention mode with the line pressure PL of the low line pressure, it is no need to provide a dedicated solenoid valve for setting up the drag prevention mode, and this makes it possible to reduce the total number of solenoid valves in the hydraulic control device 6. This also makes it possible to expect to further simplify a method of detecting a broken solenoid valve when the solenoid valve is failed.

Further, by changing the inner pressure of the torque converter 3 into the high line pressure during the drag prevention mode by means of the TC regulator valve 62, for example, it is possible to restrict the amount of lubricating oil while sufficiently ensuring a flow rate (torque converter flow rate) of the hydraulic oil to the torque converter 3 and a cooler flow rate to the oil cooler 73 in a low revolution region of the engine 1.

Moreover, by changing the lubricating pressure, set up in the lubricating regulator valve 63 by means of a signal pressure from the first solenoid valve 64, into an extremely low pressure during the drag prevention mode, it is possible to drain the lubricating oil supplied from the oil passage 220 to the strainer 72 via the spool channel of the lubricating regulator valve 63 and the oil passage 221. This makes it possible to restrict the amount of lubricating oil, and this allows the hydraulic oil (lubricating oil) to readily circulate to the intake oil passage of the hydraulic pump 60. Therefore, it is possible to improve pump efficiency of the hydraulic pump 60, and this makes it possible to improve fuel economy (gasoline mileage) of the vehicle.

Further, in the hydraulic control device for the automatic transmission according to the present invention, the AT-ECU 5 constituting the line pressure switching section may include the solenoid valve 64 for supplying an auxiliary pressure to the main regulator valve 61 by turning the first solenoid valve 64 ON in order to switch the line pressure PL from the high line pressure to the low line pressure.

Further, in the hydraulic control device for the automatic transmission according to the present invention, the lubricating regulator valve 63 may reduce, when the AT-ECU 5 constituting the line pressure switching section turns the first solenoid valve 64 OFF to switch the line pressure PL into the low line pressure, the hydraulic pressure (lubricating pressure) in the lubricating oil passage into the given pressure by discharging part of the lubricating oil.

Further, in the hydraulic control device for the automatic transmission according to the present invention, as shown in the first embodiment, the torque converter 3 may include the lock-up clutch 35 for carrying out the lock-up control, and the lubricating regulator valve 63 may reduce, when the AT-ECU 5 constituting the line pressure switching section turns the first solenoid valve 64 ON to switch the line pressure PL into the low line pressure and the AT-ECU 5 turns the second solenoid valve 66 OFF to release engagement of the lock-up clutch 35, the hydraulic pressure (lubricating pressure) in the lubricating oil passage into the given pressure by discharging part of the lubricating oil.

Further, in the hydraulic control device for the automatic transmission according to the present invention, the lubricating shift valve 69 may block off the hydraulic oil discharged from the torque converter 3 flowing into the lubricating oil passage, and may reduce the hydraulic pressure (lubricating pressure) within the lubricating oil passage into the given pressure when the AT-ECU 5 constituting the line pressure switching section turns the first solenoid valve 64 ON to switch the line pressure PL into the low line pressure.

Further, in the hydraulic control device for the automatic transmission according to the present invention, the torque converter 3 may include a lock-up clutch 35 for carrying out the lock-up control; the lubricating shift valve 69 may block off the hydraulic oil discharged from the torque converter 3 flowing into the lubricating oil passage; and it may reduce the hydraulic pressure (lubricating pressure) within the lubricating oil passage into the given pressure when the AT-ECU 5 constituting the line pressure switching section turns the first solenoid valve 64 ON to switch the line pressure PL into the low line pressure and turns the second solenoid valve 66 OFF to release engagement of the lock-up clutch 35.

As described above, although the embodiments of the hydraulic control device for the automatic transmission according to the present invention have been explained in detail on the basis of the appending drawings, the present invention is not limited to these configurations. Various modifications can be made in a scope of the technical idea described in the claims, the specification and the appending drawings without departing from the spirit and scope of the present invention. In this regard, even any shape, structure and function that are not described directly in the specification and the drawings falls within the technical idea of the present invention so long as the function and the effect of the present invention are achieved. Namely, each component constituting the hydraulic control device for the automatic transmission (hydraulic control device) 6, the FI-ECU 4, the AT-ECU 5 and the like can be replaced with any arbitrary component that can achieve the similar function to the corresponding component of the hydraulic control device for the automatic transmission.

In this regard, in the embodiments described above, it has been explained that each of the first solenoid valve 64, the linear solenoid valve 65 and the second solenoid valve 66 is a normal close type solenoid valve. However, the present invention is limited to this. Each of the linear solenoid valves 64 to 66 may be a normal open type solenoid valve that closes when an electric current is applied.

What is claimed is:

1. A hydraulic control device for an automatic transmission of a vehicle, the vehicle including a hydraulic torque converter and an automatic transmission connected to the torque converter, the automatic transmission having a plurality of frictional engagement elements, the hydraulic control device being capable of setting up any gear from a plurality of gears by causing any one of the plurality of frictional engagement elements to selectively carry out an engagement operation, the hydraulic control device comprising:

a main regulator valve that regulates a basic hydraulic pressure of hydraulic oil supplied from an oil pressure source on the basis of a stator reaction force of the torque converter to generate a line pressure, the line pressure becoming an original pressure of an engagement hydraulic oil pressure for the frictional engagement element;

a line pressure switching section that switches the line pressure to a low line pressure in a region in which the engagement hydraulic oil pressure does not require higher engagement hydraulic oil pressure in response to a driving state of the vehicle, the line pressure switching section switching the line pressure to a high line pressure when a target value of the engagement hydraulic oil pressure exceeds a predetermined pressure;

a lubricating regulator valve provided in a lubricating oil passage connected from the main regulator valve, the lubricating regulator valve regulating a hydraulic pressure in the lubricating oil passage to a given pressure in response to a driving state of the vehicle;

a torque converter regulator valve for controlling a pressure inside the torque converter; and a lubricating shift valve that switches between an oil passage for supplying hydraulic oil discharged from the torque converter into the lubricating oil passage and an oil passage for discharging lubricating oil discharged from the torque converter regulator valve.

2. The hydraulic control device for the automatic transmission according to claim 1, wherein the line pressure switching section includes a solenoid valve that applies an auxiliary pressure to the main regulator valve in order to switch the line pressure from the high line pressure to the low line pressure.

3. The hydraulic control device for the automatic transmission according to claim 1, wherein the lubricating regulator valve reduces the hydraulic pressure within the lubricating oil passage into the given pressure when the line pressure switching section switches the line pressure into the low line pressure.

4. The hydraulic control device for the automatic transmission according to claim 1, wherein the torque converter includes a lock-up clutch for carrying out lock-up control, and
wherein the lubricating regulator valve reduces the hydraulic pressure within the lubricating oil passage into the given pressure when the line pressure switching section switches the line pressure to the low line pressure and engagement of the lock-up clutch is released.

5. The hydraulic control device for the automatic transmission according to claim 1, wherein when the line pressure switching section switches the line pressure into the low line pressure, the lubricating shift valve blocks off the hydraulic oil discharged from the torque converter flowing into the lubricating oil passage, and reduces the hydraulic pressure within the lubricating oil passage into the given pressure.

6. The hydraulic control device for the automatic transmission according to claim 1, wherein the torque converter includes a lock-up clutch for carrying out lock-up control, and
wherein, when the line pressure switching section switches the line pressure into the low line pressure and engagement of the lock-up clutch is released, the lubricating shift valve blocks off the hydraulic oil discharged from the torque converter flowing into the lubricating oil passage, and reduces the hydraulic pressure within the lubricating oil passage into the given pressure.

7. The hydraulic control device for the automatic transmission according to claim 2, wherein the lubricating regulator valve reduces the hydraulic pressure within the lubricating oil passage into the given pressure when the line pressure switching section switches the line pressure into the low line pressure.

8. The hydraulic control device for the automatic transmission according to claim 2, wherein the torque converter includes a lock-up clutch for carrying out lock-up control, and
wherein the lubricating regulator valve reduces the hydraulic pressure within the lubricating oil passage into the given pressure when the line pressure switching section switches the line pressure to the low line pressure and engagement of the lock-up clutch is released.

9. The hydraulic control device for the automatic transmission according to claim 2, wherein when the line pressure switching section switches the line pressure into the low line pressure, the lubricating shift valve blocks off the hydraulic oil discharged from the torque converter flowing into the lubricating oil passage, and reduces the hydraulic pressure within the lubricating oil passage into the given pressure.

10. The hydraulic control device for the automatic transmission according to claim 3, wherein when the line pressure switching section switches the line pressure into the low line pressure, the lubricating shift valve blocks off the hydraulic oil discharged from the torque converter flowing into the lubricating oil passage, and reduces the hydraulic pressure within the lubricating oil passage into the given pressure.

11. The hydraulic control device for the automatic transmission according to claim 2, wherein the torque converter includes a lock-up clutch for carrying out lock-up control, and
wherein, when the line pressure switching section switches the line pressure into the low line pressure and engagement of the lock-up clutch is released, the lubricating shift valve blocks off the hydraulic oil discharged from the torque converter flowing into the lubricating oil passage, and reduces the hydraulic pressure within the lubricating oil passage into the given pressure.

* * * * *